United States Patent
Liu et al.

(10) Patent No.: US 11,131,996 B2
(45) Date of Patent: Sep. 28, 2021

(54) AREA PARTITIONING METHOD, PARTITION CLEANING METHOD AND ROBOT THEREOF

(71) Applicant: SHENZHEN SILVER STAR INTELLIGENT TECHNOLOGY CO., LTD., Guangdong (CN)

(72) Inventors: Peng Liu, Guangdong (CN); Lize Lin, Guangdong (CN); Linghui Sui, Guangdong (CN); Lirong Ye, Guangdong (CN)

(73) Assignee: SHENZHEN SILVER STAR INTELLIGENT TECHNOLOGY CO., LTD., Shenzhen (CN)

( * ) Notice: Subject to any disclaimer, the term of this patent is extended or adjusted under 35 U.S.C. 154(b) by 219 days.

(21) Appl. No.: 16/447,990

(22) Filed: Jun. 21, 2019

(65) Prior Publication Data
US 2020/0174485 A1   Jun. 4, 2020

(30) Foreign Application Priority Data
Nov. 29, 2018 (CN) .......................... 201811445140.4

(51) Int. Cl.
*G05D 1/02* (2020.01)

(52) U.S. Cl.
CPC ... *G05D 1/0219* (2013.01); *G05D 2201/0203* (2013.01)

(58) Field of Classification Search
CPC .................... G05D 1/0219; G05D 2201/0203
See application file for complete search history.

(56) References Cited

U.S. PATENT DOCUMENTS

| | | | |
|---|---|---|---|
| 8,364,309 B1* | 1/2013 | Bailey | G05D 1/0272 700/245 |
| 8,798,792 B2* | 8/2014 | Park | G05D 1/0219 700/253 |
| 10,168,709 B2* | 1/2019 | Kleiner | A47L 9/0488 |

(Continued)

FOREIGN PATENT DOCUMENTS

| | | |
|---|---|---|
| CN | 1365647 A | 8/2002 |
| CN | 1463658 A | 12/2003 |

(Continued)

OTHER PUBLICATIONS

First Office Action of Counterpart Chinese Patent Application No. 201811445140.4 dated Aug. 19, 2020.

(Continued)

*Primary Examiner* — Nicholas Kiswanto

(57) ABSTRACT

An area partitioning method, a partition cleaning method and a robot are provided. The area partitioning method includes: sequentially determining, according to a preset priority order, whether each of candidate directions of a current partition can satisfy a creation condition; creating, when one of the candidate directions satisfies the creation condition, a new partition in the candidate direction satisfying the creation condition; and ending area partitioning when none of the candidate directions satisfies the creation condition. The method can improve the working efficiency of the cleaning robot and avoid the occurrence of random cleaning, which leads to good use experience and has a good application prospect.

14 Claims, 5 Drawing Sheets

(56) References Cited

U.S. PATENT DOCUMENTS

| | | | | |
|---|---|---|---|---|
| 10,488,865 | B2* | 11/2019 | Afrouzi | G05D 1/0217 |
| 10,496,262 | B1* | 12/2019 | Ebrahimi Afrouzi | ......... |
| | | | | B25J 11/0085 |
| 2006/0237037 | A1* | 10/2006 | Kim | G05D 1/0219 |
| | | | | 134/18 |
| 2013/0218342 | A1* | 8/2013 | Teng | G05D 1/0234 |
| | | | | 700/259 |
| 2017/0329347 | A1* | 11/2017 | Passot | G05D 1/0088 |
| 2018/0073266 | A1* | 3/2018 | Goldenberg | B25J 11/0085 |

FOREIGN PATENT DOCUMENTS

| | | | |
|---|---|---|---|
| CN | 1493434 | A | 5/2004 |
| CN | 104635728 | A | 5/2015 |
| CN | 106998984 | A | 8/2017 |

OTHER PUBLICATIONS

Second Office Action of Counterpart Chinese Patent Application No. 201811445140.4 dated Feb. 22, 2021.
First search of Counterpart Chinese Patent Application No. 201811445140.4.

* cited by examiner

AREA PARTITIONING METHOD, PARTITION CLEANING METHOD AND ROBOT THEREOF

CROSS-REFERENCE TO RELATED APPLICATIONS

The present disclosure claims priority to Chinese Patent Application No. 201811445140.4, filed with the Chinese Patent Office on Nov. 29, 2018, entitled "Area Partitioning Method, Partition Cleaning Method and Robot Thereof", which is incorporated herein by reference in its entirety.

TECHNICAL FIELD

The present disclosure relates to the technical field of automatic control, and particularly to an area partitioning method, a partition cleaning method and a robot thereof.

BACKGROUND ART

When located in an unknown environment, a robot generally completes the environment exploration task by using SLAM (simultaneous localization and mapping), which allows the robot to gradually draw a complete map of this environment and travel to each accessible corner or area without obstruction.

It takes a relatively long time for the robot to complete the task of exploring this unknown environment. In order to improve the working or operation efficiency of the robot, the robot generally executes the corresponding work task synchronously during the process of environment exploration and environment map building. The completion of the work task is generally based on area partitioning, and with a partition as the unit, the corresponding work (such as cleaning work) is completed sequentially in each partition.

However, the existing area partitioning strategy is not reasonable in constructing a partition or working area, which makes the robot prone to the errors such as overlapping of multiple areas and repeated execution of work, resulting in relatively low overall working efficiency.

SUMMARY

Embodiments of the present disclosure provide an area partitioning method, comprising: sequentially determining, according to a preset priority order, whether each of candidate directions of a current partition can satisfy a creation condition; creating, when one of the candidate directions satisfies the creation condition, a new partition in the candidate direction satisfying the creation condition; and ending area partitioning when none of the candidate directions satisfies the creation condition.

Embodiments of the present disclosure further provide a partition cleaning method, comprising: executing cleaning work in a preset cleaning mode in an initial partition; creating, based on the initial partition, at least one new partition using the above-described area partitioning method, until area partitioning is ended; and executing cleaning work in the preset cleaning mode in the new partition.

Embodiments of the present disclosure further provide a robot.

The robot comprises: a cleaning robot, comprising a walking mechanism, an environment sensor and a cleaning mechanism, wherein the cleaning robot controls the walking mechanism to move in each partition and performs cleaning with the cleaning mechanism by using the above-described partition cleaning method, while exploring an unknown environment, by the SLAM method based on the environment sensor.

BRIEF DESCRIPTION OF DRAWINGS

One or more embodiments are described exemplarily by the figures in the accompanying drawings corresponding thereto, and such exemplary description does not constitute a limitation on the embodiments. The elements having the same reference numerals in the accompanying drawings are denoted as similar elements, and unless otherwise specifically stated, the figures in the accompanying drawings do not constitute a scale limitation.

DETAILED DESCRIPTION OF EMBODIMENTS

Figure 1:
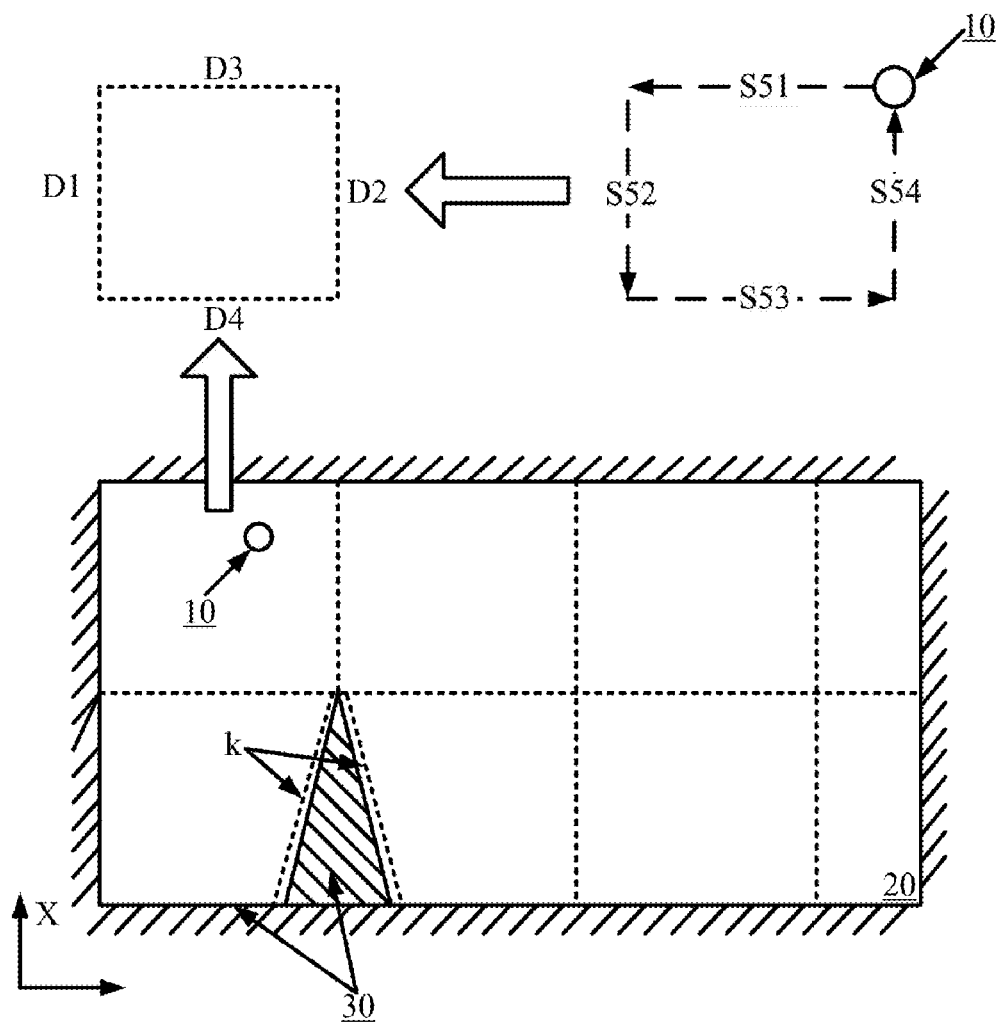
FIG. 1 is a schematic diagram of an application environment according to an embodiment of the present disclosure.

In order to facilitate understanding of the present disclosure, the present disclosure will be described in more detail below with reference to the accompanying drawings and specific embodiments. It should be noted that when an element is described as being "fixed to" another element, it can be directly on the another element or there can be one or more intermediate elements therebetween. When one element is described as being "connected" to another element, it can be directly connected to the another element or there can be one or more intermediate elements therebetween. The orientation or position relationship denoted by the terms such as "upper", "lower", "inner", "outer" and "bottom" used in the present specification is based on the orientation or position relationship indicated by the accompanying drawings, which only serves to facilitate describing the present disclosure and simplify the description, rather than indicating or suggesting that the device or element referred to must be in a particular orientation, or be constructed and operated in a particular orientation, and therefore cannot be construed as a limitation on the present disclosure. In addition, the terms such as "first", "second" and "third" are for descriptive purposes only and cannot be understood as an indication or implication of relative importance.

Unless otherwise defined, all of the technical and scientific terms used in the present specification have the same meaning as that generally construed by those skilled in the technical field of the present disclosure. In the present specification, the terms used in the specification of the present disclosure only serves the purpose of describing the specific embodiments, rather than limiting the present disclosure. The term "and/or" used in the present specification includes any of and all of the combinations of one or more associated listed items.

In addition, the technical features referred to in the different embodiments of the present disclosure described below can be combined with each other as long as they do not conflict with each other.

The embodiments of the present disclosure provide an area partitioning method, a partition cleaning method and a robot thereof, aiming to solve the technical problems in the prior art that partition construction is not reasonable and the working efficiency of the robot is relatively low.

In order to solve the above technical problems, an embodiment of the present disclosure provides the following technical solution: an area partitioning method, comprising: sequentially determining, according to a preset priority order, whether each of candidate directions of a current partition can satisfy a creation condition; creating, when one of the candidate directions satisfies the creation condition, a new partition in the candidate direction satisfying the creation condition; and ending area partitioning when none of the candidate directions satisfies the creation condition.

Optionally, the step of creating a new partition comprises: constructing, starting from a starting position and according to a preset direction and a boundary line termination condition, N end-to-end boundary lines of the new partition to form a closed partition, wherein N is a positive integer.

Optionally, the boundary line termination condition includes: reaching a preset boundary line distance or touching an obstacle.

Optionally, the step of the constructing, starting from the starting position and according to the preset direction and the boundary line termination condition, N end-to-end boundary lines of the partition to form a closed partition, specifically comprises:

moving, from an nth movement starting point, in a preset direction n, to an nth movement ending point that satisfies the boundary line termination condition;

determining a movement path from the nth movement starting point to the nth movement ending point as an boundary line of an nth partition, an nth boundary line of the new partition;

moving, with the nth movement ending point as an n+1th movement starting point, in a direction n+1, to an n+1th movement ending point that satisfies the boundary line termination condition; and determining a movement path from the n+1th movement starting point to the n+1th movement ending point as an n+1th boundary line of the new partition;

wherein n is an integer between 1 and N−1; the first movement starting point of the first boundary line and the Nth movement ending point of the Nth boundary line are both the starting positions; and the number of preset directions is the same as the number of boundary lines of the created new partition.

Optionally, the initializing a starting position specifically comprises: initializing a map coordinate system to obtain positioning coordinates of a current position; and moving to the closest obstacle and taking the position of the closest obstacle as the starting position.

Optionally, the candidate directions include leftward direction, rightward direction, upward direction and downward direction; and the candidate directions are in a priority order, which is the order of leftward direction, rightward direction, upward direction and downward direction.

In order to solve the above-described technical problems, an embodiment of the present disclosure further provides the following technical solution: a partition cleaning method, comprising: executing cleaning work in a preset cleaning mode in an initial partition; creating, based on the initial partition, at least one new partition using the above-described area partitioning method, until area partitioning is ended; and executing cleaning work in the preset cleaning mode in the new partition.

Optionally, the partition cleaning method further comprises: marking as a cleaned partition a partition that has been cleaned.

Optionally, the preset cleaning mode includes: cleaning in a shape of a Chinese character "弓" which is similar to a zigzag shape, and circular cleaning.

Optionally, the method further comprises: alternately executing the cleaning work and the new partition creation, until the last partition has been cleaned.

Optionally, the initial partition is created by the following steps:

initializing a starting position; and constructing, starting from the starting position and according to a preset direction and a boundary line termination condition, N end-to-end boundary lines to form a closed partition, wherein N is a positive integer.

In order to solve the above-described technical problems, an embodiment of the present disclosure further provides the following technical solution: a robot.

The robot comprises: a cleaning robot comprising a walking mechanism, an environment sensor and a cleaning mechanism, wherein the cleaning robot controls the walking mechanism to move in each partition and performs cleaning with the cleaning mechanism by using the above-described partition cleaning method, while exploring an unknown environment, by the SLAM method based on the environment sensor.

SLAM (simultaneous localization and mapping) is a technique for solving the problems of unknown environment exploration. When placed in an unknown environment, a robot can continuously expand and construct a map of this unknown environment through SLAM, and determine the positioning coordinates of the robot in the map, which enables ordered control to the working and movement of the robot.

Area partitioning is a strategy that a robot partitions a map into a plurality of small partitions independent from each other in the process of executing a work task. Based on the result of area partitioning, the robot can execute the work task in units of partition so as to improve the working efficiency. For example, after finishing a work task in a certain area, the robot may mark this area as a finished area so as to avoid repeated execution of the work task.

The area partitioning method provided in the embodiment of the present disclosure can specifically be applied to any type of robot, so that the robot executes a work task in units of partition while exploring an environment, which effectively improves the efficiency of the robot.

FIG. 1 is a schematic diagram of an application environment according to an embodiment of the present disclosure. In FIG. 1, description is made by taking the case as an example where a cleaning robot executes cleaning work.

Of course, those skilled in the art may also apply this area partitioning method or the corresponding partition cleaning method to other different robots or other different work tasks. The adjustments, combinations or simple transformations that are made in order to apply the methods to different robots or work tasks would all be the alternatives readily conceivable to those skilled in the art, which will fall within the scope of protection of the present disclosure.

As shown in FIG. 1, the application environment comprises: a cleaning robot 10, a to-be-cleaned environment 20 and an obstacle 30. For the cleaning robot 10, the to-becleaned environment 20 is an unknown environment. The work objective of the cleaning robot 10 is to efficiently finish the cleaning operation of the entire environment 20 by the SLAM in combination with the area partitioning strategy.

In the above, the cleaning robot 10 may comprise: a robot main body, and functional modules such as a sensor, a control chip, a walking mechanism and a cleaning mechanism.

The robot main body refers to the main structure of the cleaning robot, and is used for accommodating the hardware equipment of the cleaning robot. Corresponding shapes, structures and manufacturing materials (e.g., rigid plastics or metals such as aluminum and iron) can be used for the robot main body according to the actual needs of the robot, e.g., relatively flat cylindrical shape that is common for a cleaning robot.

For the sensor, any type of existing environmental information acquisition device may specifically be employed, including, but not limited to, laser sensors and RGBD cameras. There may be one or more sensors for providing basic data (e.g., position, robot orientation, or the distance between the robot and an obstacle, etc.) for the control chip, so as to realize SLAM and area partitioning.

The walking mechanism is a structural device disposed on the robot main body to provide moving capability for the cleaning robot. The walking mechanism can specifically be realized by any type of moving devices, e.g., a roller, a caterpillar track, or the like. It is controlled by the control chip, and drives the cleaning robot to move along a preset route according to a control instruction of the control chip.

The cleaning mechanism is a device disposed on the bottom surface of the robot main body for accomplishing a floor cleaning task, which comprises, but not limited to, a water storage tank, a mop, a V-shaped rolling brush, a dust storage tank, etc. The cleaning mechanism is also controlled by the control chip, and executes or does not execute the corresponding cleaning work during the movement of the cleaning robot.

The control chip is an electronic computing core built in the robot main body, and is used for executing logical operation steps so as to realize intelligent control of the cleaning robot. The control chip is connected to one or more sensors and used for executing a preset SLAM algorithm based on the data collected by the sensor(s), so as to construct a global map of the environment 20 and execute the area partitioning method, and issue corresponding control instructions to control the walking mechanism and the cleaning mechanism, so that the robot moves along an appropriate route and cleans the floor.

Figure 2:
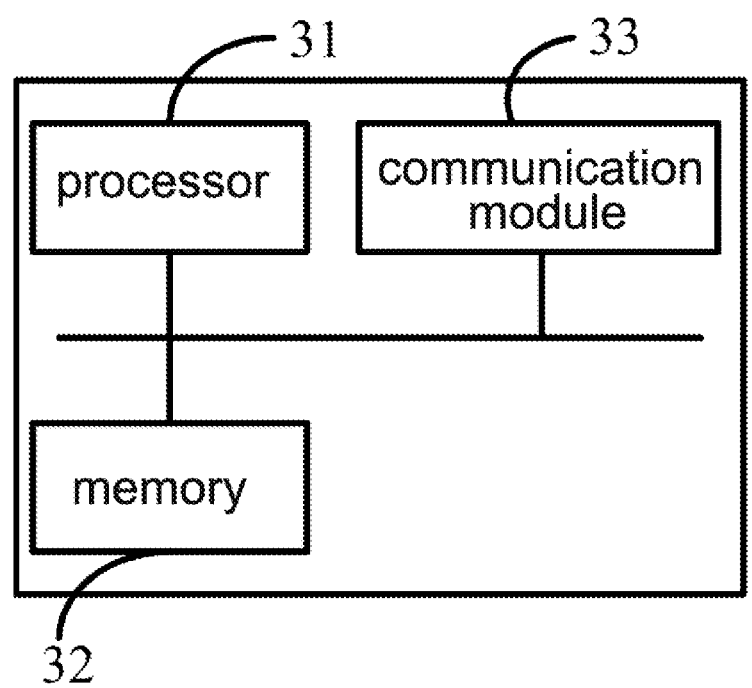
FIG. 2 is a hardware block diagram of a control chip according to an embodiment of the present disclosure.

FIG. 2 is a structural block diagram of the control chip according to an embodiment of the present disclosure. As shown in FIG. 2, the control chip may comprise: a processor 31, a memory 32 and a communication module 33. In FIG. 2, taking a bus connection as an example, communication connection between any two of the processor 31, the memory 32 and the communication module 33 is established.

The processor 31 may be any type of single-threaded or multi-threaded processor. The processor 31 may have one or more processing cores, acts as a control center and is used for acquiring data, executing a logical operation function, delivering an operation processing result, etc.

The memory 32 is a non-volatile computer-readable storage medium, e.g., at least one disk storage device, a flash memory device, a distributed storage device remotely located with respect to the processor 31, other non-volatile solid state storage devices, or the like. It has a program storage area for storing non-volatile software programs, non-volatile computer-executable programs, and modules.

These computer-executable programs and functional modules may be called by the processor 31 to cause the processor 31 to execute one or more method steps. The memory 32 may further have a data storage area for storing the operation processing results issued and output by the processor 31.

The communication module 33 is a hardware module for establishing a communication connection between the control chip and an external functional module. For the communication module 33, a corresponding type of wireless or wired communication module may be selected according to actual needs, e.g., a Wi-Fi module, a Bluetooth module, or an input/output interface, etc.

Based on the communication module 33, the control chip may collect user's instructions and present a corresponding interactive interface to the user. For example, the control chip may establish a connection with an intelligent mobile terminal of the user through the Wi-Fi module, and collect user's instructions or present the current working state of the robot to the user by means of an APP or a web client.

With continued reference to FIG. 1, the to-be-cleaned environment 20 is a space having a particular area and formed by walls and/or obstacles 30 such as doors provided on the walls, e.g., a certain room or a living room in a house.

The cleaning robot may construct a global coordinate system of the to-be-cleaned environment 20 with a particular starting point as the coordinate origin, and represent the geographical position of the cleaning robot in the to-be-cleaned environment 20 by corresponding positioning coordinates. The particular starting point may be the initial position of the cleaning robot when exploring the unknown environment (i.e., the position at which the cleaning robot just enters the to-be-cleaned environment 20). For example, when the cleaning robot is moved to a random point in the to-be-cleaned environment by the user, this initial position may be used as a coordinate origin for constructing a global coordinate system.

Relying on the SLAM, the cleaning robot 10 may continuously expand the knowledge for the to-be-cleaned environment 20 during movement and ultimately construct a complete map of the environment 20 (i.e., being capable of representing any point within the environment 20 by using a global coordinate system).

The obstacle 30 is an object that is located in the to-be-cleaned environment 20 and blocks or obstructs the free movement of the cleaning robot 10, for example, a closet, a table leg, a stool, or a protruding wall, etc in a room. In the application environment shown in FIG. 1, the obstacle 30 comprises walls or similar obstacles serving as boundaries of the to-be-cleaned environment 20.

In the process of actual use, while exploring an unknown environment using the SLAM method, the cleaning robot 10, based on one or more kinds of data collected by the sensor, may also be controlled to move in each partition and finish the cleaning task in units of partition by using the specific area partitioning method.

When executing the cleaning task, the cleaning robot may finish the cleaning work of a certain partition according to specific path planning. For example, the cleaning robot may clean a partition along a path in a shape of a Chinese character "弓", or may clean a partition along a circular path. When the cleaning work in a partition has been finished, the position of the cleaning robot 10 is random, and when the cleaning work has been finished, the position of the cleaning robot 10 may be the same as or different from the position of the starting point. Therefore, there is a need to provide an area partitioning method to prevent random cleaning of the cleaning robot 10.

Figure 3:
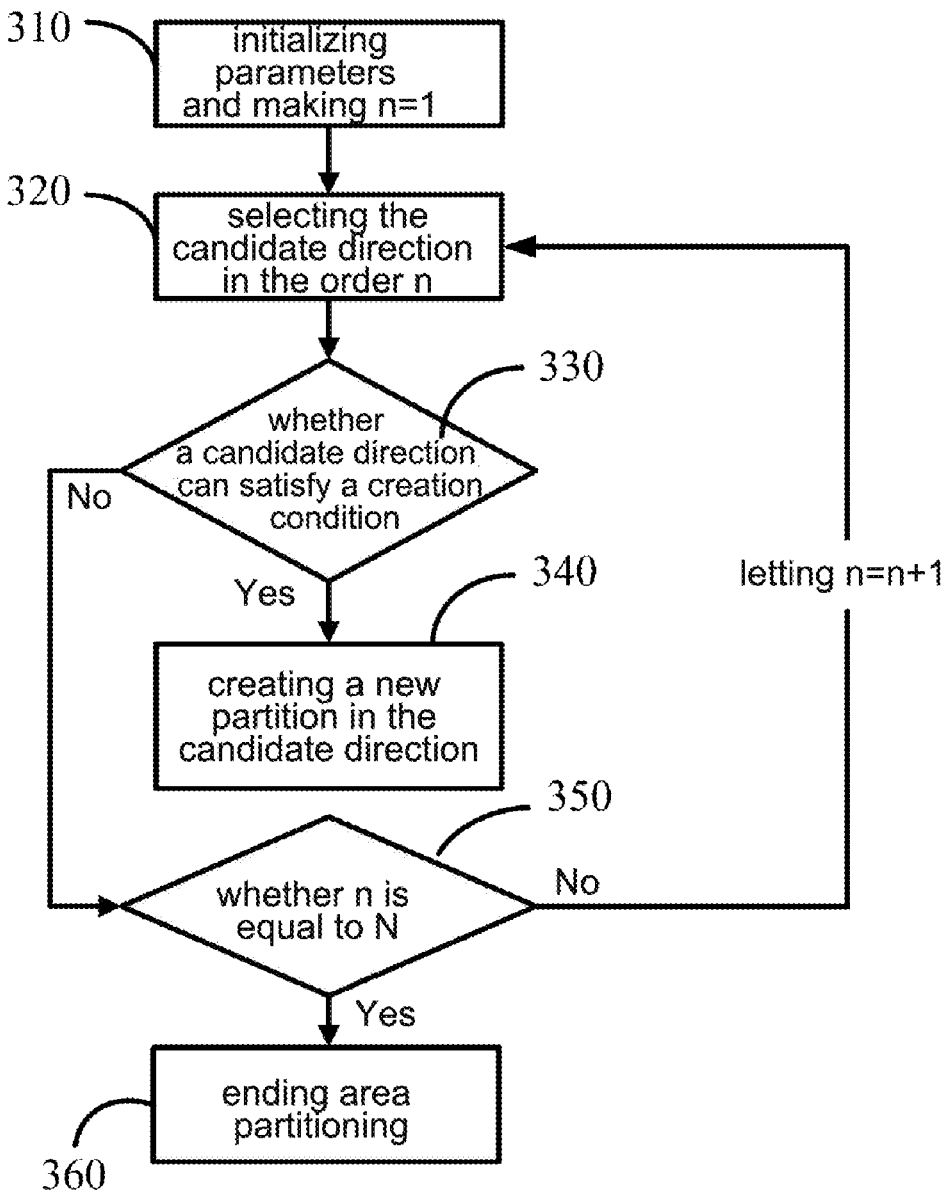
FIG. 3 is a method flowchart of an area partitioning method according to an embodiment of the present disclosure.

FIG. 3 illustrates an area partitioning method according to an embodiment of the present disclosure. The area partitioning method can be executed by the control chip so as to regularly perform area partitioning on the environment 20, construct a new partition based on the original partition, and then execute cleaning in the new partition, which prevents the occurrence of the case that the cleaning robot does not know where to execute cleaning as its position is random when the work task in a certain partition has been finished.

As shown in FIG. 3, the area partitioning method may comprise the following steps:

310. Initializing parameters and making n=1, wherein n is the order of a candidate direction in a sequence of directions arranged in a preset priority order.

The candidate direction is described based on the partition where the cleaning robot is currently located, for example, being on the left or right of the partition where the cleaning robot is currently located. An appropriate number of candidate directions may be set as required by the actual situation. A greater number of directions represents better resolution. For example, when candidate directions are set at an interval of 90°, four candidate directions, i.e., upward direction, downward direction, leftward direction and rightward direction, which are arranged in sequence, may be set, and when n=1, the corresponding candidate direction is "upward direction"; when n=2, the corresponding candidate direction is "downward direction"; when n=3, the corresponding candidate direction is "leftward direction"; and when n=4, the corresponding candidate direction is "rightward direction".

320. Selecting the candidate direction in the order n, wherein the order n represents the order of the position of the candidate direction in the sequence.

In the present embodiment, the candidate direction with a higher priority is ranked before the candidate direction with a lower priority, thereby forming a sequence arranged according to the priority order. The priorities of different candidate directions may specifically be set in advance by those skilled in the art according to the actual situation.

330. Determining whether the selected candidate direction can satisfy a creation condition of creating a new partition, if yes, executing step 340, and if not, executing step 350.

The creation condition refers to a measurement criterion for determining whether a partition needs to be created or can be created in the current candidate direction. It may be one condition or a combination of several conditions set by a technician according to the actual situation.

In some embodiments, the creation condition may be that there is no obstacle that blocks partition creation and/or that there is an area in the candidate direction where no partition has been created. Of course, those skilled in the art may also select to use another different condition or combination of several conditions according to the needs of actual situation so as to determine whether there is an obstacle or whether the area is an area where no partition has been created, for example, whether the sensor detects an obstruction with a continuous length (indicating the presence of a wall) or whether the area is a cleaned area.

340. Creating a new partition in the candidate direction.

For the newly created partition, a partition of a same or a different size may specifically be created in any suitable manner in order to be adapted to different specific circumstances. For example, the system may set a default size of the newly created partition (e.g., a 4 m×4 m square), and when a partition of the default size can be set in the candidate direction, the partition of the default size is created accordingly.

If it is impossible to construct a partition of the default size due to the obstruction of an obstacle in the candidate direction or other similar situations, the cleaning robot can also change the default size accordingly (e.g., modifying the same to a 4 m×2 m rectangle or an irregular area), and create a partition with an appropriate size.

In some embodiments, the newly created partition may specifically be created clinging to the boundary line of the original partition. The boundary lines of the two partitions may also be aligned with each other to make area partitioning more regular.

350. Determining whether n is equal to N, wherein N is the total number of candidate directions, if yes, executing step 360, and if not, letting n=n+1 and returning to step 320.

The total number of candidate directions may be set by the technician according to the actual situation, for example, 4 or more selectable directions. When a candidate direction is selected that cannot satisfy the creation condition, the variable n may be incremented by 1 so as to select the next candidate direction in the sequence until the candidate direction located at the end of the sequence is selected (i.e., when n=N).

360. Ending the area partitioning. Ending the area partitioning indicates that the entire environment 20 has been partitioned and there is no area that has not yet been partitioned.

In the method provided in the embodiment of the present disclosure, whether each of the candidate directions of the current partition can satisfy the creation condition is determined sequentially according to a preset priority order, until one of the candidate directions can satisfy the creation condition, and then a new partition is created in the candidate direction satisfying the creation condition. When all the directions are traversed and it is determined that none of the directions satisfies the creation condition, area partitioning is ended, and it is determined that area partitioning has been finished for the environment 20.

In such a way, it is possible to determine the strategy of entering the next partition when the cleaning robot executes the work task in the current partition or after the cleaning robot finishes the work task, so as to prevent the robot from randomly performing the cleaning work in the environment 20 to affect the cleaning efficiency of the cleaning robot.

In some embodiments, the control chip may specifically complete the process of creating a new partition in the following manner. First, a starting position is initialized. This starting position is the origin for the construction of a partition, is the base of the partition, and can generally be located on an edge of the partition. In some embodiments, the cleaning robot may initialize the map coordinate system, acquire the positioning coordinates of the current position, and then move to the nearest obstacle and take this position as the starting position to create a new partition. In addition, the point where the user randomly places the cleaning robot after holding the cleaning robot into a certain space may also be the origin.

Starting from the starting position and according to a preset direction and a boundary line termination condition, N end-to-end boundary lines of the partition are then constructed to form a closed partition, wherein N is a positive integer.

A boundary line is an artificially defined boundary or limit, which is used to define different partitions. It specifically depends on the size or shape of the partition where it is required to be used. The number of boundary lines may also be set by the technician according to the actual situation, or the robot may execute area partitioning by itself according to the situation of the environment and the partition side length preset by the system, and a different number of boundary lines corresponds to a different partition shape. For example, when N is 3, the shape of the partition is a triangle, and when N is 4, the shape of the partition may be a square or a rectangle.

The preset direction refers to various different extending directions of the boundary line facing to the east, south, west, north, as well as southeast, southwest, northeast, northwest, etc. The preset direction may include a plurality of different directions arranged in order. In the process of constructing the boundary lines, the corresponding directions can be selected sequentially so as to finally form a closed partition.

The boundary line termination condition is a judgment criterion for determining whether the boundary line needs to continue to extend in a particular direction. In the case where the boundary line termination condition is satisfied, it indicates that the boundary line has reached its end, and a new direction needs to be selected to construct another boundary line.

In some embodiments, the boundary line termination condition includes: reaching a preset boundary line distance or touching an obstacle. That is, when moving in the current direction to reach a preset distance or touch an obstacle, the cleaning robot will stop advancing, and record the movement starting point for constructing the current boundary line and record the position satisfying the boundary line termination condition as the movement ending point. The movement starting point and the movement ending point form one of the boundary lines of one of the partitions.

Constructing N end-to-end boundary lines to form a closed partition is a continuous iteration execution process. These boundary lines are connected one after another, with the movement ending point of each boundary line being the movement starting point of the next boundary line. The movement ending point of the last constructed boundary line returns to the movement starting point of the first constructed boundary line, thereby forming a closed partition.

Figure 4:
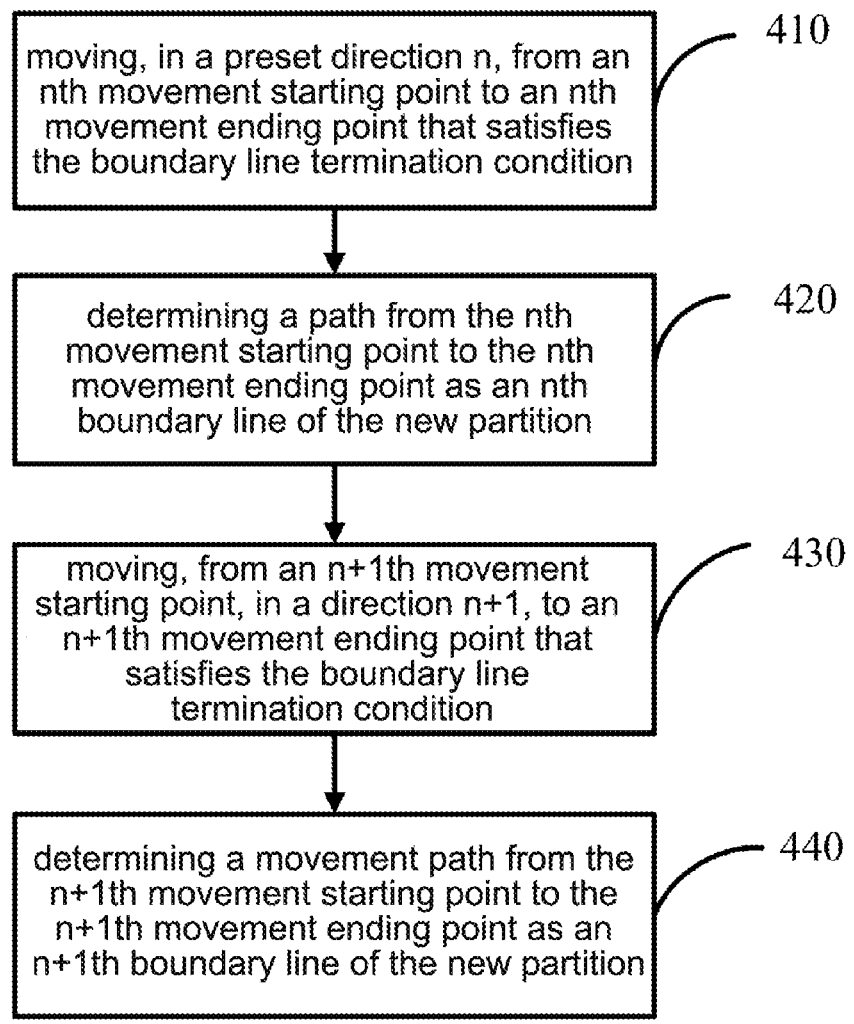
FIG. 4 is a method flowchart of a method for creating a new partition according to an embodiment of the present disclosure.

FIG. 4 illustrates the specific process of N boundary lines of a new partition forming a closed partition according to an embodiment of the present disclosure. As shown in FIG. 4, the process includes the following cyclically executed steps:

410. Moving, from an nth movement starting point, in a preset direction n, to an nth movement ending point that satisfies the boundary line termination condition, wherein n is an integer between 1 and N−1.

420. Determining a path from the nth movement starting point to the nth movement ending point as an nth boundary line of the new partition.

430. Moving, from an n+1th movement starting point, in a direction n+1, to an n+1th movement ending point that satisfies the boundary line termination condition.

In this embodiment, the number of preset directions is the same as the number of boundary lines of the partition to be created, the direction n one-to-one corresponds to the nth boundary line of the partition, and the n boundary lines will be extended and created in the preset direction order, so as to form the partition.

440. Determining a movement path from the n+1th movement starting point to the n+1th movement ending point as an n+1th boundary line of the new partition.

As described in the above embodiment, for the adjacent nth boundary line and n+1th boundary line, in an end-to-end manner, the movement ending point of the nth boundary line is connected to the movement starting point of the n+1th boundary line, and the nth movement ending point of the nth boundary line is the movement starting point of the n+1th boundary line. That is, at the time of creating the next boundary line, the movement ending point of the previous boundary line always serves as the movement starting point of the next boundary line.

The iterative execution of steps 410-440 enables sequential obtaining of the first boundary line to the Nth boundary line of the new partition, and the movement ending point of the Nth boundary line returns to the movement starting point of the first boundary line, thereby forming the new partition.

In the present embodiment, at the time of constructing each new partition, the value of n starts from 1, and after the execution of step 440 is completed, n is made to become n+1 and the process returns to step 410 again until n is equal to N−1. N is the total number of boundary lines required to form a partition, and both the first movement starting point and the Nth movement ending point are the starting positions for creating a new partition.

Figure 5:
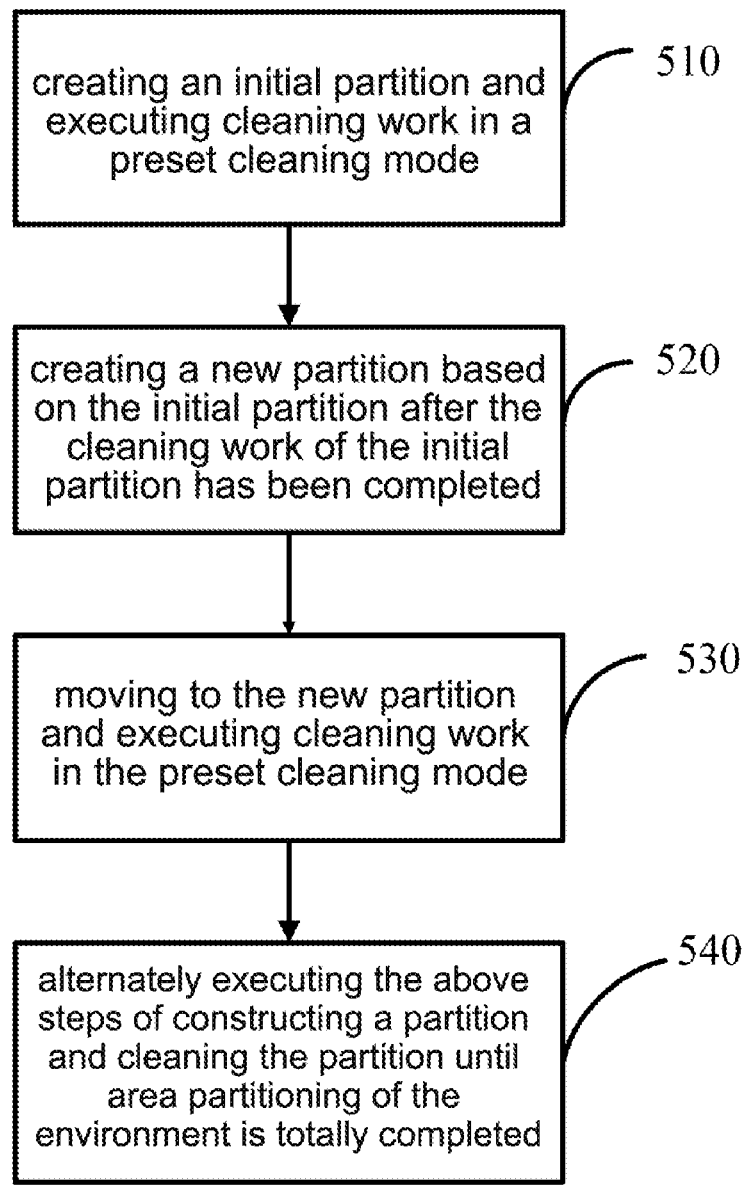
FIG. 5 is a method flowchart of a partition cleaning method according to an embodiment of the present disclosure.

Based on the area partitioning method provided in the embodiment of the present disclosure, the cleaning robot 10 may execute the partition cleaning method shown in FIG. 5 while exploring the location environment. As shown in FIG. 5, the partition cleaning method comprises the following steps:

510. Creating an initial partition and executing cleaning work in a preset cleaning mode.

In some embodiments, the initial partition may be created in the following manner: first, initializing a starting position, wherein the starting position may be an initial position of the cleaning robot in the to-be-cleaned environment, and then constructing, starting from the starting position and according to a preset direction and a boundary line termination condition, N end-to-end boundary lines to form a closed partition, wherein N is a positive integer.

The preset cleaning mode refers to a path planning strategy for the cleaning robot 10 to complete the cleaning work in the whole partition. Any type of path planning strategy may be used as long as it can ensure that the floor within the partition is cleaned.

In some embodiments, after the cleaning work of a certain partition has been finished, the partition may be marked as a cleaned partition using a specific number or symbol, and used as one of the creation conditions in the area partitioning method shown in FIG. 3, to assist the cleaning robot in area partitioning so as to avoid repeated cleaning of a certain area.

520. Creating a new partition based on the initial partition after the cleaning work of the initial partition has been completed. Specifically, the method for creating a new partition disclosed in the embodiment of the present disclosure may be used, and for the sake of brevity of description, no repeated description is made herein.

530. Moving to the new partition and executing cleaning work in the preset cleaning mode.

540. Alternately executing the above steps of creating a partition (520) and cleaning the partition (530) until area partitioning of the to-be-cleaned environment 20 is totally completed. In addition, the cleaning robot 10 may stop working after finishing the cleaning work of the last partition.

Referring again to FIG. 1, in FIG. 1, the case where the value of N is 4 is taken as an example (accordingly, the created partition is a quadrilateral area).

On the basis of the standard direction x, there are four candidate directions around the partition where the cleaning robot is currently located, i.e., a left area boundary D1 located on the left side of the standard direction, a right area boundary D2 located on the right side of the standard direction, an upper area boundary D3 in the standard direction and a lower area boundary D4 in the direction opposite to the standard direction. The priority order is D1, D2, D3 and D4 in sequence.

Each time a new partition is created, the cleaning robot may first determine whether the area boundary D1 on the left side of the current partition is an obstacle or a wall, or whether the left area is a cleaned area. If the left area boundary is not a wall or an obstacle, and the left area is not a cleaned area, a new partition can be created clinging to the left side of the current partition.

If the left area boundary is an obstacle or a wall or if the left area is a cleaned area, whether there is an obstacle 30 (e.g., a wall) on the right, upper or lower boundary of the current area or whether the corresponding area is a cleaned area is sequentially determined, thereby determining in which direction of the current area a partition is to be created or whether to end the area partitioning process.

The cleaning robot may perform the cleaning work on the partition in one or more cleaning modes. For example, a cleaning mode in a shape of a Chinese character "弓" or a circular cleaning mode may be used to perform thorough cleaning on a certain partition. The cleaned partition will be marked as a cleaned area, which is used as a determination condition for determining the direction in which the new partition is located.

In actual operation process, it is feasible to indicate whether a partition has been cleaned by any type of the marking method. For example, a partition that has been cleaned is marked with a specific symbol or number.

While expanding and exploring a global map using the SLAM, the cleaning robot 10 may repeatedly execute the above-described partition creating step based on the partition which is currently cleaned, and execute the cleaning task in the newly created partition until no area that can satisfy the creation condition can be searched. By alternately executing the creation of new partition and the cleaning work on new partition, the partition cleaning work task of the cleaning robot can just be completed.

Based on the front, rear, left and right directions and their priority order provided in this embodiment, the system of the cleaning robot 10 may also create a new partition in the manner shown in FIG. 1:

first, initializing a starting position, and then, with the starting position as the starting point, moving to the left until an obstacle is touched or the moving distance reaches a system preset value (for example, 4 meters), and then stopping moving, to construct a boundary line 1 (which is denoted by S51 in FIG. 1);

starting from the ending point of the boundary line 1, moving downwards until an obstacle is touched or the moving distance reaches the system preset value, and then stopping moving, to construct a boundary line 2 (which is denoted by S52 in FIG. 1), continuing to move to the right from the ending point of the boundary line 2 until an obstacle is touched or the moving distance reaches the system preset value, and then stopping moving, to construct a boundary line 3 (which is denoted by S53 in FIG. 1); and finally moving to the right from the ending point of the boundary line 3 until an obstacle is touched or the moving distance reaches the system preset value, and then stopping moving, to return to the starting position to construct a boundary line 4 (which is denoted by S54 in FIG. 1), wherein a new partition is formed by the boundary lines 1 to 4.

After the new partition has been created, the cleaning robot may clean the new partition, and after the cleaning is completed, the next partition is created on the basis of the partition and the cleaning robot is guided to clean it.

In some embodiments, the environment 20 does not actually appear as a regular map (e.g., square or rectangle), and there may be one or more obstacles occupying certain space, which will cause the map of the environment 20 to be in a special shape (e.g., the triangular protrusion as shown in FIG. 1).

Thus, in the process of constructing a partition, the system of the cleaning robot 20 can also employ a strategy of moving along a wall, to move counterclockwise in the extending direction of a wall or an obstacle (as indicated by the boundary line k in FIG. 1), so that the boundary line can be kept tightly attached to the obstacle so as to ensure that all the areas in the environment 20 can be covered. The specific extending direction of a wall or an obstacle can be obtained by calculation based on the basic data collected by the sensor of the cleaning robot.

Compared with the prior art, the area partitioning method provided by the embodiment of the present disclosure provides a more efficient and reasonable area partitioning strategy, which enables a robot, while executing partition cleaning, to know the strategy of entering the next partition before finishing the work task in one partition, thereby effectively preventing the occurrence of area overlapping and random cleaning, and improving the working efficiency of the robot.

In summary, the area partitioning method and the partition cleaning method provided in the embodiments of the present disclosure can improve the working efficiency of the cleaning robot, and enable complete covering of the to-be-cleaned environment 20. By using such a partition cleaning method, the control chip can avoid the occurrence of random cleaning, which leads to good use experience and has a good application prospect.

It should be noted that the area partitioning method or the partition cleaning method provided by the embodiments of the present disclosure may be executed by one or more functional modules of the control chip. The various steps described in connection with the embodiments disclosed herein can be implemented by electronic hardware, computer software, or a combination of them, and in order to clearly illustrate the interchangeability of hardware and software, in the above description, the constitution and steps of each example have been generally described in terms of functions. Whether these functions are executed by means of hardware or software depends on the specific application and design constraints of the technical solutions. Those skilled in the art may also use a different method for each particular application to implement the described functions, and such implementation should not be considered as going beyond the scope of the present disclosure.

Finally, it should be noted that the above embodiments are only used to illustrate the technical solutions of the present disclosure, rather than limiting the same; under the idea of the present disclosure, the technical features in the above embodiments or different embodiments may also be combined, the steps may be implemented in any order, and there are many other variations in the different aspects of the present disclosure as described above, which are not provided in detail for the sake of brevity; although the present disclosure has been described in detail with reference to the foregoing embodiments, it should be understood by those of ordinary skills in the art that modifications may still be made to the technical solutions disclosed in each of the foregoing embodiments, or equivalent substitutions may be made to some of the technical features therein; and these modifications or substitutions will not cause the essence of the corresponding technical solutions to depart from the scope of the technical solution of each embodiment of the present disclosure.

The invention claimed is:

1. A partition cleaning method, comprising:
  exploring, by a cleaning robot, an unknown environment through simultaneous localization and mapping (SLAM) technique;
  while exploring the unknown environment, executing, by the cleaning robot, an area partitioning method to create partitions to be cleaned, and executing cleaning work in a preset cleaning mode in each newly created partition until all partitions to be cleaned are cleaned;
  the area partitioning method comprising:
  sequentially determining, according to a preset priority order, whether each of candidate directions of a current partition can satisfy a creation condition;
  creating, when one of the candidate directions satisfies the creation condition, a new partition in the candidate direction satisfying the creation condition; and
  ending the area partitioning when none of the candidate directions satisfies the creation condition.

2. The partition cleaning method according to claim 1, further comprising: marking as a cleaned partition a partition in which cleaning work has been finished.

3. The partition cleaning method according to claim 1, wherein the preset cleaning mode comprises: a cleaning in a shape of a Chinese character "弓" and a circular cleaning.

4. The partition cleaning method according to claim 1, wherein an initial partition is created by following steps:
  initializing a starting position; and
  constructing, starting from the starting position and according to a preset direction and a boundary line termination condition, N end-to-end boundary lines to form a closed initial partition, wherein N is a positive integer.

5. A cleaning robot, comprising a walking mechanism, an environment sensor and a cleaning mechanism, wherein the cleaning robot controls the walking mechanism to move in each partition and performs cleaning with the cleaning mechanism by using the partition cleaning method according to claim 1, while exploring the unknown environment through the SLAM based on the environment sensor.

6. The partition cleaning method according to claim 1, wherein creating a new partition comprises:
  constructing, starting from a starting position and according to a preset direction and a boundary line termination condition, N end-to-end boundary lines of the new partition to form a closed partition, wherein N is a positive integer.

7. The partition cleaning method according to claim 6, wherein the boundary line termination condition comprises: reaching a preset boundary line distance or touching an obstacle.

8. The partition cleaning method according to claim 6, wherein a step of the constructing, starting from a starting position and according to a preset direction and a boundary line termination condition, N end-to-end boundary lines of the new partition to form a closed partition, comprises:
  moving, from the nth movement starting point, in a preset direction n, to the nth movement ending point that satisfies the boundary line termination condition;
  determining a movement path from the nth movement starting point to the nth movement ending point as the nth boundary line of the new partition;
  moving, with the nth movement ending point as an n+1th movement starting point, in a direction n+1, to an n+1th movement ending point that satisfies the boundary line termination condition; and
  determining a movement path from the n+1th movement starting point to the n+1th movement ending point as an n+1th boundary line of the new partition,
  wherein n is an integer between 1 and N-1; a first movement starting point of a first boundary line and the Nth movement ending point of the Nth boundary line are both the starting positions; and the preset directions are in number same as boundary lines of the new partition.

9. The partition cleaning method according to claim 6, wherein the area partitioning method further comprises:
  initializing a map coordinate system to obtain positioning coordinates of a current position; and
  moving to a closest obstacle and taking a position of the closest obstacle as the starting position.

10. The cleaning robot according to claim 5, further comprising: marking as a cleaned partition a partition in which cleaning work has been finished.

11. The cleaning robot according to claim 5, wherein the preset cleaning mode comprises: a cleaning in a shape of a Chinese character "弓" and a circular cleaning.

12. The cleaning robot according to claim 5, wherein an initial partition is created by following steps:
  initializing a starting position; and
  constructing, starting from the starting position and according to a preset direction and a boundary line termination condition, N end-to-end boundary lines to form a closed initial partition, wherein N is a positive integer.

13. The partition cleaning method according to claim 1, wherein the candidate directions comprise a leftward direction, a rightward direction, an upward direction and a downward direction; and the candidate directions are in a priority order, which is the order of the leftward direction, the rightward direction, the upward direction and the downward direction.

14. The partition cleaning method according to claim 1, wherein in the process of creating a partition, the cleaning robot moves counterclockwise in an extending direction of a wall or an obstacle, so that a boundary line can be kept attached to the wall or obstacle.

* * * * *